United States Patent
Wood et al.

[11] Patent Number: 6,132,694
[45] Date of Patent: Oct. 17, 2000

[54] CATALYST FOR OXIDATION OF VOLATILE ORGANIC COMPOUNDS

[75] Inventors: George M. Wood, Newport News; Billy T. Upchurch, Virginia Beach; David R. Schryer, Hampton; Patricia P. Davis, Yorktown; Erik J. Kielin, Norfolk; Kenneth G. Brown, Virginia Beach; Jacqueline L. Schyryer, Hampton, all of Va.; Christine M. D'Ambrosia, Henrietta, N.Y.

[73] Assignee: The United States of America as represented by the Administrator of the National Aeronautics and Space Administration, Washington, D.C.

[21] Appl. No.: 08/991,075

[22] Filed: Dec. 16, 1997

[51] Int. Cl.⁷ .............................. B01J 8/00; C01B 31/20
[52] U.S. Cl. ...................... 423/245.1; 423/437.1
[58] Field of Search .............. 423/245.1, 437 R

[56] References Cited

U.S. PATENT DOCUMENTS

| | | | |
|---|---|---|---|
| 4,053,556 | 10/1977 | Acres | 423/245.1 |
| 4,855,274 | 8/1989 | Upchurch | 502/339 |
| 4,912,082 | 3/1990 | Upchurch | 502/218 |
| 5,585,083 | 12/1996 | Kielin et al. | 423/245.3 |
| 5,854,948 | 12/1998 | Chuang et al. | 423/245.1 |

*Primary Examiner*—Steven P. Griffin
*Assistant Examiner*—Maribel Medina
*Attorney, Agent, or Firm*—Hillary W. Hawkins

[57] ABSTRACT

Disclosed is a process for oxidizing volatile organic compounds to carbon dioxide and water with the minimal addition of energy. A mixture of the volatile organic compound and an oxidizing agent (e.g. ambient air containing the volatile organic compound) is exposed to a catalyst which includes a noble metal dispersed on a metal oxide which possesses more than one oxidation state. Especially good results are obtained when the noble metal is platinum, and the metal oxide which possesses more than one oxidation state is tin oxide. A promoter (i.e., a small amount of an oxide of a transition series metal) may be used in association with the tin oxide to provide very beneficial results.

22 Claims, 1 Drawing Sheet

CATALYST FOR OXIDATION OF VOLATILE ORGANIC COMPOUNDS

ORIGIN OF INVENTION

The invention described herein was jointly made by employees of the United States Government, contract employees during the performance of work under a NASA contract which is subject to the provisions of Public Law 95-517 (35 USC 202) in which the contractor has elected not to retain title, and an employee of Rochester Gas and Electric Corporation during the performance of work under a Memorandum of Agreement and may be manufactured and used by or for the Government for governmental purposes without payment of royalties thereon or therefor.

BACKGROUND OF THE INVENTION

1. Field of the Invention

This invention relates generally to oxidizing volatile organic compounds. It relates particularly to a process for oxidizing volatile organic compounds to $CO_2$ and $H_2O$ with minimal addition of energy. This process includes exposing a gaseous mixture containing hydrocarbons or other volatile organic compounds, and an oxidizing agent to a catalyst of a noble metal dispersed on a metal oxide possessing more than one stable oxidation state.

2. Description of Related Art

In many applications it is highly desirable, if not necessary, to remove hydrocarbons and other volatile organic compounds from the air via oxidation to $CO_2$ and $H_2O$ without the aid of filters and with minimal heating of the catalyst. By way of example, there has been a long-standing need for a method to remove volatile organic compounds from indoor air—i.e., breathable air in enclosed spaces such as homes, automobiles, airplanes, ships, boats, and industrial plants where there may be high concentrations of said compounds. Other significant long-standing needs include the need to purify compressed air and other oxygen-containing gases, as well as the employment of personal safety masks in the removal of volatile organic compounds from the atmosphere. There has also been a need for such a method in selective chemical sensors and catalytic converters for combustion processes, including internal combustion engines which utilize gasoline, diesel, natural gas, and alcohol fuels.

Prior methods employed to remove volatile organic compounds in such applications include: (1) the purification of enclosed spaces by filtering and exhausting to outside air, (2) the use of Hopcalite® catalyst heated to 200° C.–315° C. for the oxidation of alcohols, and (3) the employment of three-way noble catalysts, such as those presently used in automobiles for emissions control. These methods are unsatisfactory for several reasons. First, filters employ a surface on which the species to be removed is absorbed. The amount of said species to be removed depends on the total number of active surface sites available for absorption. Once all sites are occupied, the filter ceases to work and must be replaced. Filters contain the absorbed volatile organic compounds and may require special disposal as hazardous waste. Second, exhausting to the outside air requires duct work, fans and electrical power and adds contaminant gas to the atmosphere. Third, the Hopcalite® catalyst requires large quantities and high temperatures to accomplish oxidation of a given alcohol. Fourth, the three-way noble catalysts have had particular trouble completely oxidizing ethanol, even at temperatures above 500° C. Said catalysts similarly have had trouble oxidizing methane and do not allow catalytic control of methane emissions. They require exhaust gas temperatures of 300° C. and higher to convert 50% of non-methane hydrocarbons to $CO_2$ and $H_2O$ (light-off) and temperatures of 450° C. or higher for methane light-off.

It is accordingly a primary object of the present invention to provide an efficient means for removal of hydrocarbons and other volatile organic compounds from the medium in which it exists as an unwanted, toxic impurity, without the use of filters and further with the addition of minimal energy.

It is another primary object of the present invention to provide for the removal of hydrocarbons and other volatile organic compounds from the medium in which it exists as an unwanted, toxic impurity, by presenting a catalytic process for the oxidation of hydrocarbons and other volatile organic compounds to carbon dioxide and water with the addition of minimal energy.

SUMMARY OF THE INVENTION

These primary objects and other objects and benefits are achieved by the provision of a process which includes exposing a gaseous mixture containing volatile organic compounds and an oxidizing agent to a catalyst comprising from about 1 to about 50 weight percent, based on the total weight of the catalyst, of a noble metal selected from the group consisting of platinum, palladium, gold, silver, and rhodium, which has been dispersed on from about 50 to 99 weight percent, based on the total weight of the catalyst, of a metal oxide which possesses more than one stable oxidation state.

Very beneficial results are achieved by means of a preferred embodiment wherein the gaseous mixture comprising volatile organic compounds and an oxidizing agent is ambient air containing volatile organic compounds, the noble metal is platinum, and metal oxide which possesses more than one stable oxidation state comprises tin oxide.

Especially good results are obtained from another preferred embodiment wherein the metal oxide which possesses more than one stable oxidation state consists of tin oxide in association with a promoter selected from the group consisting of oxides of the metals of the transition series of the periodic table of elements, the promoter being present in an amount sufficient to provide from about 1 to about 12 atom percent of promoter metal to tin metal.

When no promoter is employed in association with the tin oxide of the catalyst, to attain the highest catalyst activity per unit mass of catalyst material, it is preferred to employ platinum in an amount sufficient to provide about 15 weight percent, based on the total weight of catalyst, with the remainder of the catalyst being unpromoted tin oxide. However, for more practical applications when the highest catalyst activity per unit mass of noble metal is desirable, it is preferred to employ platinum in an amount sufficient to provide about 1 weight percent, based on the total weight of the catalyst, with the remainder of the catalyst being unpromoted tin oxide.

When a promoter is employed in association with the tin oxide of the catalyst, it is especially preferred that the promoter be present in an amount sufficient to provide about 3 atom percent of promoter metal to tin metal. Especially good results are obtained with a 1–2% platinum loading relative to the tin oxide when the catalyst is heated. The platinum loading on such catalysts is based on the total weight of metal oxides (promoter and tin oxide).

DESCRIPTION OF THE PREFERRED EMBODIMENT

Figure 1:
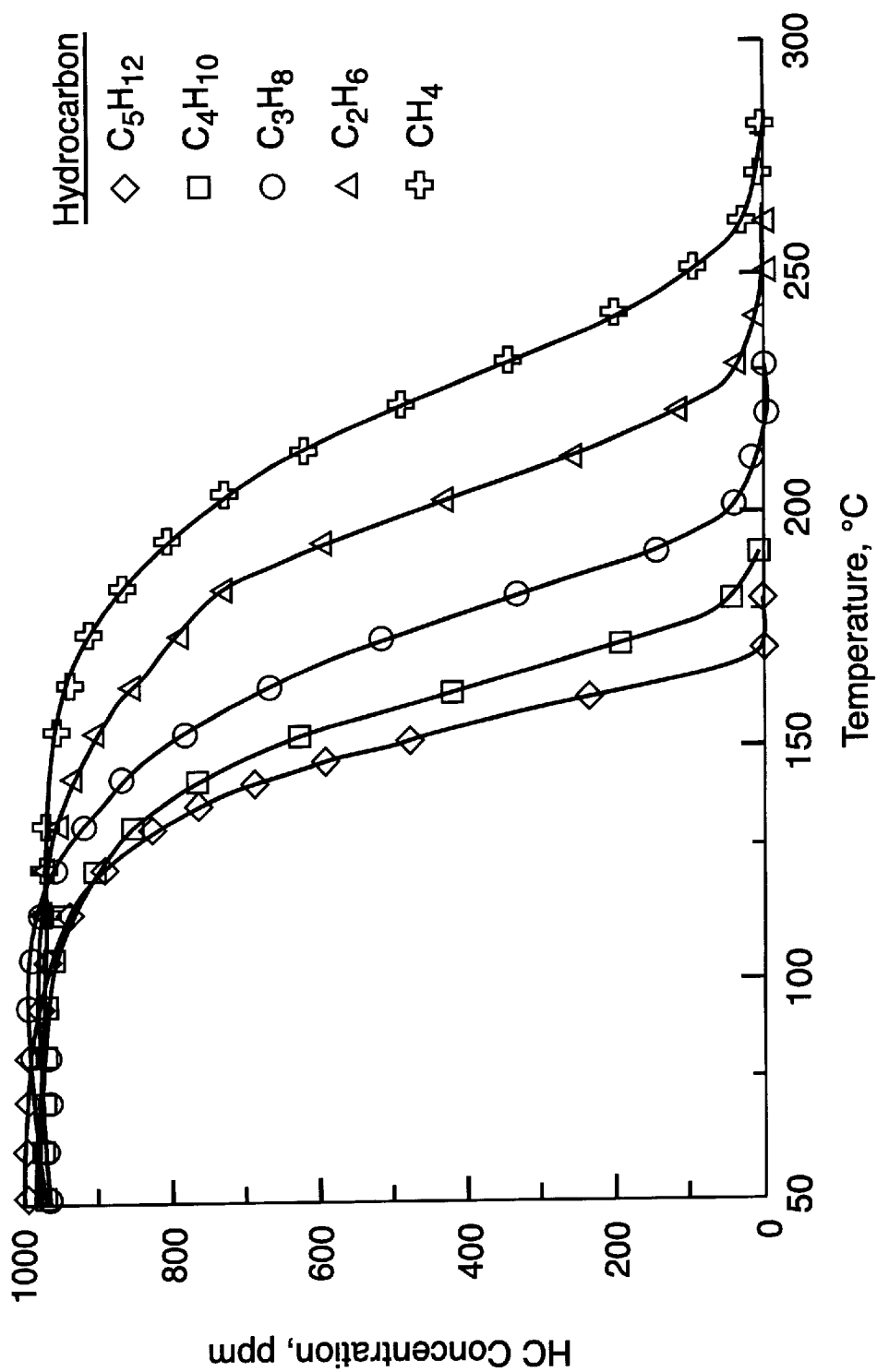
FIG. 1 is a graph of hydrocarbon concentration over temperature range in which oxidation occurred for $C_1$ to $C_5$ straight-chain hydrocarbons.

The catalyst for volatile organic compound oxidation according to the present invention consists of a noble metal dispersed on a metal oxide possessing more than one oxidation state. Noble metals include platinum, palladium, gold, silver, and rhodium and comprise 1 to 50 percent of the catalyst by weight with the balance (50–99 percent) being the metal oxide. The metal oxides upon which the noble metal is dispersed include tin oxide, either pure or promoted with small amounts of the oxides of the transition series metals (i.e. iron, manganese, copper, cobalt, nickel, etc.). The composition of the oxide can vary from 1 to 12 atom percent of promoter metal to tin metal. Especially good results are found with 15 percent by weight of platinum with the balance being unpromoted tin oxide. For promoted catalyst formulations, best results are obtained when the promoter concentration is approximately 3 atom percent of promoter metal to tin metal. The catalyst can exist as a powder, or it can be prepared as a coating on supports such as granules, pellets, honeycomb monoliths, or fabrics.

A catalyst employed in the present inventive process is prepared as follows:

The preparation of similar powder catalysts or catalysts coated on silica gel, silica beads, or pellets has been presented in our earlier U.S. Patents "Process for Making a Noble Metal on Tin Oxide Catalyst," U.S. Pat. No. 4,855,274, "Catalyst for Carbon Monoxide Oxidation," U.S. Pat. No. 4,912,082, and "Catalyst for Carbon Monoxide Oxidation," U.S. Pat. No. 4,991,181.

Preparation of platinum-tin oxide-based catalyst coatings for pellets, beads, granules, fabrics, and especially ceramic honeycomb monoliths is accomplished by successive layering of the desired components, as follows: (1) a clean, dry substrate is deaerated in a solution containing tin (II) 2-ethylhexanoate (SnEH, hereafter). The substrate is removed from the solution, and excess solution is removed from the substrate. Residual solution components are evaporated leaving an SnEH layer on the substrate which is thermally decomposed in air to tin oxide at 300° C. Several layers are applied in the same manner to achieve the desired loading of tin oxide. (2) If desired, a promoter is added to the catalyst matrix in a similar fashion. For example, an iron oxide promoter is added to an existing tin oxide-coated substrate by dearating in an iron nitrate solution, removing excess solution, evaporating the solvent, and finally thermally decomposing the nitrate to oxide. (3) Platinum is added to the coated substrate as above using an aqueous solution of tetraamine platinum (II) dihydroxide or other platinum salt, with chloride-fee salts being preferred, and then thermally decomposing the salt. Instead of the thermal decomposition, a reductive decomposition can be used. For example, the catalyst coated substrate is heated in an atmosphere containing a reducing gas such as carbon monoxide or hydrogen to induce reduction of the platinum salt to platinum.

The instant process operates merely by passing a gaseous mixture containing a hydrocarbon or other volatile organic compound plus oxygen or other oxidizing agent (such as air or the nitrogen oxides) over the catalyst using any of a number of methods well known in the art, and monitoring the gas composition both upstream and downstream of the catalyst. The catalyst (1) absorbs both the volatile organic compound and the oxidizing agent, (2) enables reaction between the adsorbates with minimal addition of energy, and then (3) desorbs the oxidation products, thereby freeing sites for more absorptions and reaction to occur. The catalyst operates efficiently over a range of temperatures.

The present invention is a significant improvement over the prior art in that: (1) the process works by oxidizing volatile organic compounds to carbon dioxide and water, nontoxic components already found in the air. Unlike the filters of the prior art, the active sites of the catalyst absorb the volatile organic compound only long enough to convert it to carbon monoxide and water. Consequently, the sites again become available for absorption/oxidation of more volatile organic compounds. Although catalysts eventually degrade, they require replacement much less often than filters. (2) The catalyst in the present process does not retain the volatile organic compound and therefore does not constitute a waste problem as filters do. (3) The catalyst in the present process converts volatile organic compounds to harmless gaseous components already found in air and therefore does not contribute to outside air pollution, unlike prior art systems which simply exhaust air to the outside. (4) The catalyst in the present process requires the addition of minimal heat.

EXAMPLES

1. Test results for $C_1$ to $C_5$ Straight-Chain hydrocarbons

In a test according to the present invention, the non-branched, saturated $C_1$ to $C_5$ hydrocarbons were oxidized over both promoted and unpromoted $Pt/SnO_2$-based catalysts. The $C_1$ to $C_5$, HC test gases were in concentrations of approximately 1000 ppm in Ultra Zero Air. Each was a gravimetric standard.

TABLE ONE

| Hydrocarbon | Concentration |
| --- | --- |
| methane | 969 ppm |
| ethane | 984 ppm |
| propane | 996 ppm |
| butane | 975 ppm |
| pentane | 1000 ppm |

Each catalyst sample was held in a reactor made of ⅜" o.d. stainless steel tubing bored out slightly to accept a catalyst piece ¾" to 1" in length, such that no quartz wool support was necessary. The weight of each such piece was 0.4 to 0.5 grams of which about 22% was catalyst coating thus giving about 90 to 100 mg of catalyst.

The catalyst was exposed to nitrogen or air in order to establish a baseline at 35° C. (0 ppm HC). The air stream was switched to the HC test gas and allowed to equilibrate until a stable line was obtained indicating the total unconverted HC concentration. The temperature was incremented at 2° C. per minutes for 5 minutes (10° C. total) and then held for 15 minutes to allow desorption and equilibration. The temperature was ramped from 35° C. up to a temperature high enough to completely oxidize the HC, anywhere from 190° C. to 280° C. depending on the HC. The temperature was held for 15 minutes and then the system was cooled back to 35° C.

Desorption was observed as the temperature was initially increased from 35° C. to between 80° C. and 120° C., at which point oxidation was initiated for all hydrocarbons and little desorption was observed. The light-off temperature ranged from about 150° C. for hexane to 220° C. for methane. The greater the number of carbon atoms per molecule, the more easily the hydrocarbon oxidized and consequently the lower the temperature range over which oxidation occurs. The complete oxidation occurred at temperatures well below the autoignition temperature (309° C. for pentane to 537° C. for methane) of each hydrocarbon.

2. Test results for alcohols

In another test according to the present invention, less than 100 mg of catalyst (14% Pt/SnO$_2$) at 29±1° C. oxidized about 6500 ppm of methanol to CO$_2$ over an oxygen concentration range of 20% down to near stoichiometry at which point the catalyst activity decreases.

For ethanol, oxidation began at a catalyst temperature of about 30° C. or lower, by 125° C., the ethanol was completely oxidized.

For propanol, oxidation began at a catalyst temperature of about 50° C. or lower, by 120° C., the propanol was completely oxidized.

For isopropyl alcohol, oxidation began at a catalyst temperature of 100° C.

We claim:

1. A process for the oxidation of volatile organic compounds to carbon dioxide and water which undergoes initiation at temperatures from about $-5°$ C. to about 120° C., which process comprises exposing a gaseous mixture comprising said volatile organic compound and an oxygen containing oxidizing agent to a catalyst comprising from about 1 to 50 weight percent, based on the total weight of the catalyst, of a noble metal selected from the group consisting of platinum, palladium, gold, silver, and rhodium, which has been dispersed on from about 50 to 99 weight percent, based on the total weight of the catalyst, of a metal oxide which possesses more than one stable oxidation state including at least tin oxide, the carbon dioxide produced from oxidation with said oxidizing agent consisting of the product of oxidizing said volatile organic compound with said noble metal tin oxide catalyst.

2. The process of claim 1, wherein the gaseous mixture comprising said volatile organic compound and an oxidizing agent is ambient air containing said volatile organic compound; the noble metal is platinum; and the metal oxide which possesses more than one stable oxidation state comprises tin oxide.

3. The process of claim 2, wherein the metal oxide which possesses more than one stable oxidation state consists of tin oxide in association with a promoter selected from the group consisting of oxides of the metals of the transition series of the periodic table of elements, the promoter being present in an amount sufficient to provide from about 1 to about 12 atom percent of promoter metal to tin metal.

4. The process of claim 3, wherein the promoter is present in an amount sufficient to provide about 3 atom percent of promoter metal to tin metal.

5. The process of claim 2, wherein the catalyst comprises about 15 weight percent of platinum, based on the total weight of the catalyst, with the remainder of the catalyst being unpromoted tin oxide.

6. The process of claim 1, wherein the volatile organic compound is a hydrocarbon.

7. The process of claim 6, wherein the hydrocarbon is methane.

8. The process of claim 6, wherein the hydrocarbon is ethane.

9. The process of claim 6, wherein the hydrocarbon is propane.

10. The process of claim 6, wherein the hydrocarbon is butane.

11. The process of claim 6, wherein the hydrocarbon is pentane.

12. The process of claim 1, wherein the volatile organic compound is an oxygen-containing compound.

13. The process of claim 12, wherein said oxygen-containing compound is an alcohol.

14. The process of claim 13, wherein said alcohol is methanol.

15. The process of claim 13, wherein said alcohol is ethanol.

16. The process of claim 13, wherein said alcohol is propanol.

17. The process of claim 13, wherein said alcohol is isopropyl alcohol.

18. The process of claim 12, wherein said oxygen-containing compound is a ketone.

19. The process of claim 12, wherein said oxygen-containing compound is an ether.

20. The process of claim 12, wherein said oxygen-containing compound is an epoxide.

21. The process of claim 12, wherein said oxygen-containing compound is an aldehyde.

22. The process of claim 12, wherein said oxygen-containing compound is a carboxylic acid.

* * * * *